United States Patent Office 3,374,202
Patented Mar. 19, 1968

3,374,202
HOMOPOLYMERIC AND COPOLYMERIC ESTERS OF DUROHYDROQUINONE
Eckhard Christian August Schwarz, Grifton, N.C., assignor to E. I. du Pont de Nemours and Company, Wilmington, Del., a corporation of Delaware
No Drawing. Filed Oct. 5, 1964, Ser. No. 401,697
8 Claims. (Cl. 260—47)

ABSTRACT OF THE DISCLOSURE

Linear polymeric esters derived from at least one organic dicarboxylic acid and an organic diol constituent which is wholly or in part durohydroquinone. Fibers of these polymeric esters exhibit high modulus and high recovery.

---

This invention relates to a novel class of polyesters, and to fibers, films, and other shaped articles produced therefrom.

The novel products of the invention are linear polyesters derived from at least one organic dicarboxylic acid and an organic diol constituent which may be wholly or in part durohydroquinone. In the form of fibers the polyesters will have an intrinsic viscosity of at least 0.3, as measured in solution at 25° C. in one part by volume of trifluoroacetic acid and three parts by volume of methylene chloride. The invention, however, also contemplates films and other shaped articles comprising durohydroquinone polyesterification products.

In the form of fibers, the polyesters of this invention have a high modulus and high recovery. Homopolymeric esters of durohydroquinone will also generally lead to fibers having a high degree of crystallinity.

The novel polymers of the invention may alternatively be characterized as linear polyesters comprising recurring units of the formula:

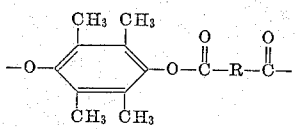

wherein R is selected from the group consisting of a covalent bond and a divalent organic radical. The invention comprises homopolymers, e.g. as consisting of the above units wherein R is the same, as well as copolyesters, e.g. wherein R differs in various units within the same polymer molecule or wherein the molecule is made up of the above units together with similar ester units in which a different organic radical replaces the durylene radical.

The durohydroquinone, either alone or in combination with one or more other diols, may be reacted with a wide variety of dicarboxylic acids of the formula $R(COOH)_2$ to form the novel polyesters of the invention. Thus R may be simply a covalent bond, as in oxalic acid, or aliphatic, cycloaliphatic, or aromatic. Mixtures of various dicarboxylic acids may suitably be used to form copolyesters. Among various dicarboxylic acids which may be used are adipic acid, sebacic acid, hexahydroterephthalic acid, terephthalic acid 2,6- or 2,7-naphthalic acid, diphenoxyethane - 4,4' - dicarboxylate, bis-carboxyphenyl ketone, and p,p'-sulphonyldibenzoic acid. In place of the dicarboxylic acid, an ester-forming derivative of it may be used; i.e., a derivative of the dicarboxylic acid which readily undergoes polyesterification with a glycol or derivative thereof. For example, a lower alkyl ester of the dicarboxylic acid may be used, such as the dimethyl ester. Alternatively, an acid chloride may be used.

For the preparation of copolyesters, typically suitable diols which may be used in conjunction with durohydroquinone include ethylene glycol, butylene glycol, decamethylene glycol, polyethylene ether glycols of M.W. 200 to 10,000, 1,4-dihydroxymethylcyclohexane, bisphenol A, and the like.

A convenient method for preparing the polyesters of the invention involves reaction of the durohydroquinone, optionally along with another diol constituent, and the diphenyl ester of the dicarboxylic acid or acids in the desired proportion in an ester interchange reaction followed by polycondensation at high temperature and at low partial pressure of the diol, until a polymer of the desired molecular weight is produced. In carrying out the ester interchange reaction, at least one molecular proportion of diol per molecular proportion of the ester should be used, preferably about 1.5 to 2.1 mols of diol per mol of the ester. It is advantageous to employ catalysts to accelerate the rate of reaction, and it has been found that manganous acetate, calcium acetate, and sodium methoxide are suitable ester interchange catalysts while antimony trioxide, litharge, and the tetra-alkyl titanates such as tetraisopropyl titanates are suitable polycondensation catalysts.

Instead of reacting the diols with the diphenyl ester of the acids, other esters of the acids may be used, especially lower alkyl esters, or the like. The polyesters may also be prepared by reacting the acid or acids directly with the diol or diols, or with esters of the diols with acetic or other lower aliphatic acids. Other equivalent methods may be employed so long as the end product polyester contains dicarboxylic acid radicals alternating with durohydroquinone radicals. In one embodiment of the invention, terephthalic acid or an ester forming derivative thereof is reacted with a mixture of 1 to 10 mol percent durohydroquinone and 99 to 90 mol percent of ethylene glycol.

The novel polyesters of the invention are well suited to a variety of applications. High molecular weight products can be readily melt spun into filaments or cast from solution to form self-supporting films. Lower molecular weight products are useful as adhesives.

The expression "polymer melt temperature" employed with respect to the products of this invention is the minimum temperature at which a sample of the polymer leaves a wet molten trail as it is stroked with moderate pressure across a smooth surface of a heated metal. "Polymer melt temperature" has sometimes in the past been referred to as "polymer stick temperature."

The term "intrinsic viscosity," as used herein, is defined as the limit of the fraction $\ln(r)/c$, as $c$ approaches 0, where $(r)$ is the relative viscosity, and $c$ is the concentration in grams per 100 ml. of solution. The relative viscosity $(r)$ is the ratio of the viscosity of a solution of the polymer in a mixture of 1 part trifluoroacetic acid and 3 parts methylene chloride (by volume) to the viscosity of the trifluoroacetic acid/methylene chloride mixture, per se, measured in the same units at 25° C. Intrinsic viscosity is a measure of the degree of polymerization.

Durohydroquinone can be prepared as follows: Duroquinone is obtained from durene according to the procedure of Blatt, Org. Synthesis, Collective vol. II, p. 254. Duroquinone is then reduced by refluxing in acetic acid and slowly adding zinc dust until the solution becomes clear white. Upon cooling of the acetic acid solution, white crystals of durohydroquinone are separated, M.P. 210° C.

In the following examples a number of the polymerizations were performed using as a catalyst a solution of sodium hydrogen hexabutyltitanate, $NaHTi(OBu)_6$. This was prepared by dissolving 1 g. of sodium in 200 ml. of n-butyl alcohol, then adding to this solution 15.0 g. of tetra-n-butyl titanate.

This invention is further illustrated, but is not intended to be limited, by the following examples in which parts and percentages are by weight, unless otherwise specified.

Example I

Homopolyester of durohydroquinone and succinic acid. The polymer has the formula

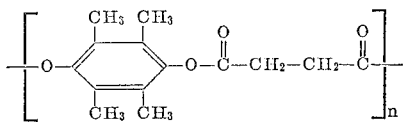

wherein $n$ is an integer indicative of the number of repeating units and preferably is sufficiently large to give an intrinsic viscosity of at least 0.3.

A small polymer tube was charged with:

Durohydroquinone _____ 3.32 g.=0.020 mol.
Diphenylsuccinate _____ 5.40 g.=0.020 mol.
$Sb_2O_3$ _____ 0.3 mg.

The tube was heated in a bath to 245° C. for one hour at atmospheric pressure, after which liberation of phenol vapors had ceased. Vacuum (0.2 mm. Hg) was then applied and the temperature of the bath was raised to 295° C. The mixture in the tube which had solidified, melted again and then solidified after 35 minutes at 295° C. Vacuum at this temperature was maintained for another 1½ hours.

The polymer so obtained had a polymer melt temperature of 330° C. (slight decomposition noted) and an intrinsic viscosity of 0.38. Fibers could be drawn from the melt.

Example II

Homopolyester of durohydroquinone and isophthalic acid. The polymer has the formula

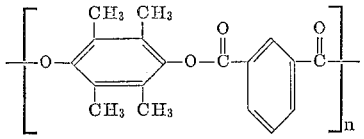

wherein $n$ is an integer indicative of the number of repeating units and preferably is sufficiently large to give an intrinsic viscosity of at least 0.3.

Into a polymer tube were placed durohydroquinone (10.5 g., 0.0632 mol), diphenylisophthalate (20.3 g., 0.0632 mol) $Sb_2O_3$ (0.5 mg.). The tube was heated to 265° C. for 30 minutes whereupon the molten reaction mixture began to solidify. The temperature was raised to 300° C., and after 15 minutes the evolution of phenol ceased. Vacuum (0.2–0.3 mm. Hg) was then applied for two hours. The crystalline polymer had a polymer melt temperature of 325° C. and an intrinsic viscosity of 0.23.

This low molecular weight polymer was useful as a thermoplastic adhesive for bonding sheets of aluminum together.

By increasing the polymerization period to six hours, a polymer of fiber forming viscosity could be obtained.

Example III

Homopolyester of durohydroquinone and sebacic acid. The polymer has the formula

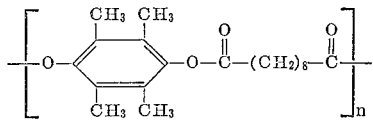

wherein $n$ is an integer indicative of the number of repeating units and preferably is sufficiently large to give an intrinsic viscosity of at least 0.3.

Into a polymer tube was heated durohydroquinone (1.997 g., 0.0120 mol), diphenylsebacate (4.250 g., 0.0120 mol), $Sb_2O_3$ (0.2 mg.). The tube was heated to 245° C. for 1½ hours, after which evolution of phenol had ceased. Vacuum was then applied for one hour at 265° C. On cooling, a crystalline polymer formed having a polymer melt temperature of 140° C. and an intrinsic viscosity of 0.28. This polymer could be used as a hot melt adhesive for paper and paperboard. An increase in the polymerization period enables the formation of a fiber forming polymer.

Example IV

Durohydroquinone yields polyesters having remarkable resistance to thermal degradation as compared to those of the related bis-(hydroxymethyl)durene compound. This is illustrated by the present example wherein corresponding polyesters of both diols are made and compared for thermal degradation properties (as measured by gas evolution).

(A) Homopolyester of durohydroquinone and suberic acid. The polymer has the formula

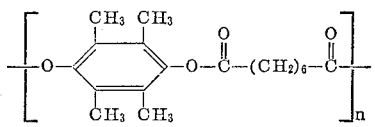

wherein $n$ is an integer indicative of the number of repeating units and preferably is sufficiently large to give an intrinsic viscosity of at least 0.3.

A small polymer tube was charged with:

Durohydroquinone _____ 3.32 g.=0.020 mol.
Diphenylsuberate _____ 6.53 g.=0.020 mol.
$Sb_2O_3$ _____ 0.3 mg.

The tube was heated in a bath to 245° C. for 1¾ hours at atmospheric pressure under nitrogen, after which liberation of phenol vapors had ceased. Vacuum (0.2 mm. Hg) was then applied and the temperature of the bath was raised to 280° C. for three hours.

The highly crystalline polymer so obtained had a polymer melt temperature of 170° C. and an intrinsic viscosity of 0.57. Fibers could be drawn from the melt.

(B) Homopolyester of 1,4-bis-(hydroxymethyl)durene and suberic acid. The polymer has the formula

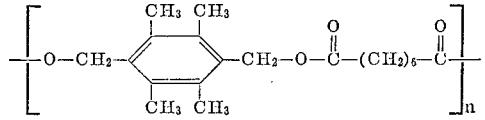

wherein $n$ is an integer indicative of the number of repeating units and preferably is sufficiently large to give an intrinsic viscosity of at least 0.3.

A small polymer tube was charged with:

1,4-bis-(hydroxymethyl)durene ____ 3.88 g.=0.020 mol.
Suberyl dichloride _____ 4.22 g.=0.020 mol.

The tube was heated in a bath to 70–80° C. for one-half hour at atmospheric pressure with nitrogen bubbling through the melt. Heating was continued for another one-half hour at 150° C. Vacuum (0.2 mm. Hg) was then applied and the temperature was raised to 220° C. for 30 minutes, then 260° C. for 15 minutes. A highly viscous melt resulted. HCl gas was trapped in a Dry-Ice/acetone cooled trap containing NaOH pellets.

The crystalline polymer so obtained had a polymer melt temperature of 160° C. and an intrinsic viscosity of 0.61. Cold-drawable fibers could be drawn from the melt.

(C) Thermal degradation properties for the polyesters of (A) and (B) above were determined as follows:

The rate of gas evolution was measured upon heating a 1 to 2 gram polymer sample to 275° C. for 35 minutes. Evolved gas was measured volumetrically at intervals of 1 minute by means of a mercury manometer. The mols of gas evolved were calculated from pressure-temperature data as mols of gas evolved per minute per mol of polymer repeating unit. The rates were determined from data between 10 and 35 minutes (the first 10 minutes being disregarded to eliminate the effect of air and other adventitious materials) with the following results:

| Sample | M.W. of Repeating Unit | Intrinsic Viscosity after Thermal Treatment | Gas Evolved in Mol/ Min./Mol of Polymer Repeating Unit |
|---|---|---|---|
| Polyester A | 304 | [1] 0.48 | 9.1×10⁻⁵ |
| Polyester B | 332 | [2] 0.41 | 15.9×10⁻⁵ |

[1] From 0.57.
[2] From 0.61.

The 1,4-bis-(hydroxymethyl)durene, containing aliphatic hydroxyls, results in polyesters which are considerably more susceptible to thermal degradation than those of durohydroquinone, which of course is phenolic.

Example V

For use in the preparation of alternating copolyesters the following bis-isophthalate ester of durohydroquinone is made:

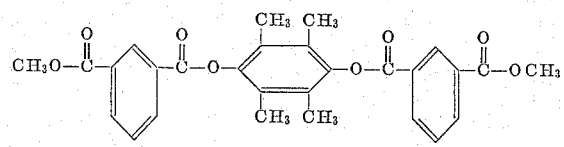

8.3 g. of durohydroquinone in 70 ml. anhydrous pyridine were placed in a 3-neck flask fitted with a dropping funnel, condenser and stirrer. 20.25 g. of m-carbomethoxy benzoylchloride in 25 ml. methylene chloride were added slowly over a period of 30 minutes. The flask was then heated to reflux temperature for 2 hours. The pyridine solution was then condensed under vacuum to 30 ml., the product was precipitated by addition of 50 ml. water, filtered, and recrystallized from methanol, yield 21.5 g., M.P. 151° C.

Example VI

An alternating copolyester of durohydroquinone, 1,4-butane diol, and isophthalic acid. The polymer has the formula

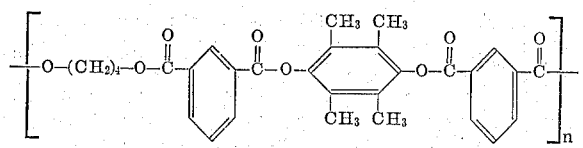

wherein $n$ is an integer indicative of the number of repeating units and preferably is sufficiently large to give an intrinsic viscosity of at least 0.3.

A small polymer tube was charged with:
The bis-isophthalate ester of Example V _____ 4.85 g.=0.01 mol.
1,4-butanediol _____ 1.0 ml.
NaHTi(OBu)₆ solution _____ 0.05 ml.

The tube was heated to 240° C. under atmospheric pressure, vacuum was then gradually applied and the temperature raised to 285° C. for 3 hours.

The polymer so obtained had a polymer melt temperature of 185° C. (amorphous). Upon heating the polymer to 175° C. for 2 hours it can be crystallized to give a crystalline melting point of 205° C. and an intrinsic viscosity of 0.60. Fibers could be drawn from the melt.

Example VII

An alternating copolyester of durohydroquinone, ethylene glycol, and isophthalic acid. The polymer has the formula:

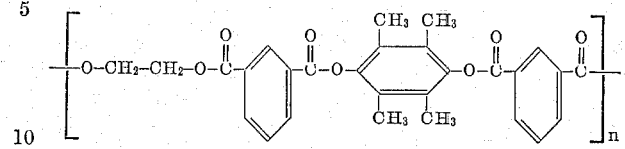

wherein $n$ is an integer indicative of the number of repeating units and preferably is sufficiently large to give an intrinsic viscosity of at least 0.3.

A small polymer tube was charged with:
The bis-isophthalate ester of Example V _____ 4.85 g.=0.01 mol.
Ethylene glycol _____ 1.25 ml.
Sb₂O₃ (dissolved in the glycol) ___ 0.0012 g.
Manganous acetate (dissolved in the glycol) _____ 0.0020 g.

The tube was heated at 195° C. for 1½ hours at atmospheric pressure (under nitrogen). The temperature was then raised to 285° C. over a period of 20 minutes, vacuum (0.2 mm. Hg) was gradually applied and maintained for 3½ hours.

The polymer so obtained had a polymer melt temperature of 200° C. (amorphous). Upon heating the polymer to 180° C. for 2 hours it can be crystallized to give a crystalline melting point of 225° C. and an intrinsic viscosity of 0.62. Fibers could be drawn from the melt.

Example VIII

For use in the preparation of alternating copolyesters the following bis-terephthalate ester of durohydroquinone is made:

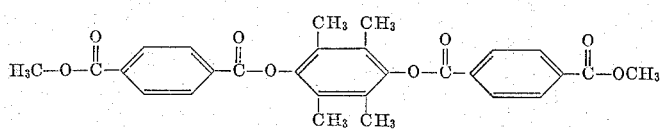

16.6 g. of durohydroquinone (0.1 mol) were dissolved in 150 ml. of anhydrous pyridine, purged by a stream of nitrogen, and placed in a 3-neck flask fitted with dropping funnel, condenser and stirrer.

40.5 g. of p-carbomethoxybenzoylchloride (0.205 mol) in 50 ml. methylene chloride were added dropwise within 30 minutes. The flask was then placed on a steam bath and heated for 2 hours.

Addition of 100 ml. of water caused the product to precipitate, recrystallization from methanol afforded 38.5 g. M.P. 188° C.

Example IX

An alternating copolyester of durohydroquinone, 1,4-butane diol, and terephthalic acid. The polymer has the formula

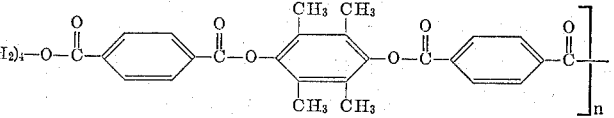

wherein $n$ is an integer indicative of the number of repeating units and preferably is sufficiently large to give an intrinsic viscosity of at least 0.3.

A small polymer tube was charged with:
The bis-terephthalate ester of Example VIII _____ 4.85 g.=0.01 mol.
1,4-butane diol _____ 1.0 ml.
TiHNa(OBu)₆ solution _____ 0.05 ml.

The tube was heated to 235° C. for 30 minutes, then the temperature was raised to 285° C. and vacuum was gradually applied (0.2 mm. Hg) and maintained for 3 hours.

The polymer so obtained had a polymer melt temperature of 205° C. (amorphous). Upon heating the polymer to 185° C. for 2 hours it can be crystallized to give a crystalline melting point of 230° C. and an intrinsic viscosity of 0.85. Fibers could be drawn from the melt.

*Example X*

An alternating copolyester of durohydroquinone, ethylene glycol, and terephthalic acid. The polymer has the formula

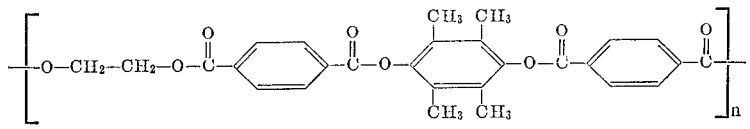

wherein $n$ is an integer indicative of the number of repeating units and preferably is sufficiently large to give an intrinsic viscosity of at least 0.3.

A small polymer tube was charged with:

| | |
|---|---|
| The bis-terephthalate ester of Example VIII | 4.85 g.=0.01 mol. |
| Ethylene glycol | 1.25 g.=0.022 mol. |
| $Sb_2O_3$ (dissolved in the glycol) | 0.0012 g. |
| Manganous acetate (dissolved in the glycol) | 0.0020 g. |

The tube was heated at atmospheric pressure at 195° C. for 1½ hours, then the temperature was raised to 285° C. over a period of 25 minutes. Vacuum was applied gradually and maintained at 285° C. for 3½ hours at 0.2–0.3 mm. Hg.

The polymer so obtained had a polymer melt temperature of 230° C. (amorphous). Upon heating the polymer to 220° C. for 2 hours it can be crystallized to give a crystalline melting point of 275–180° C. and an intrinsic viscosity of 0.58. Fibers could be drawn from the melt.

As many widely different embodiments of this invention may be made without departing from the spirit and scope thereof, it is to be understood that this invention is not to be limited to the specific embodiments thereof except as defined in the appended claims.

What is claimed is:
1. A linear polymeric ester selected from the class consisting of homopolyesters consisting essentially of recurring units of the formula

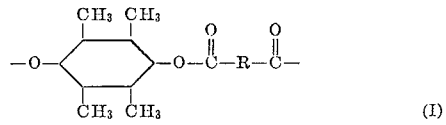

and copolyesters consisting essentially of recurring units of the formulas

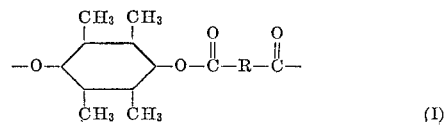

and

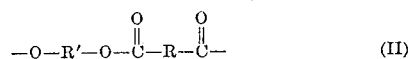

wherein R is selected from the group consisting of a covalent bond a divalent organic radical and R′ is a divalent organic radical.

2. Fibers of a linear polymeric ester as defined in claim 1 and having an intrinsic viscosity of at least 0.3, as measured in solution at 25° C. in one part by volume of trifluoroacetic acid and three parts by volume of methylene chloride.

3. A linear homopolymeric ester as defined in claim 1 wherein R is the radical remaining after removal of the carboxyl groups from succinic acid.

4. A linear homopolymeric ester as defined in claim 1 wherein R is the radical remaining after removal of the carboxyl groups from suberic acid.

5. A linear copolymeric ester as defined in claim 1 wherein R is the radical remaining after removal of the carboxyl groups from isophthalic acid and R′ is the radical remaining after removal of the hydroxyl groups from 1,4-butane diol and wherein units of the Formula I alternate with units of the Formula II in the polymer chain.

6. A linear copolymeric ester as defined in claim 1 wherein R is the radical remaining after removal of the carboxyl groups from isophthalic acid and R′ is the radical remaining after removal of the hydroxyl groups from ethylene glycol and wherein units of the Formula I alternate with units of the Formula II in the polymer chain.

7. A linear copolymeric ester as defined in claim 1 wherein R is the radical remaining after removal of the carboxyl groups from terephthalic acid and R′ is the radical remaining after removal of the hydroxyl groups from 1,4-butane diol and wherein units of the Formula I alternate with units of the Formula II in the polymeric chain.

8. A linear copolymeric ester as defined in claim 1 wherein R is the radical remaining after removal of the carboxyl groups from terephthalic acid and R′ is the radical remaining after removal of the hydroxyl groups from ethylene glycol and wherein units of the Formula I alternate with units of the Formula II in the polymer chain.

References Cited

UNITED STATES PATENTS

| 2,455,653 | 12/1948 | Bralley et al. | 260—77.5 |
| 2,856,375 | 10/1958 | Mikeska. | |

WILLIAM H. SHORT, *Primary Examiner.*

LOUISE P. QUAST, *Assistant Examiner.*